United States Patent [19]
Tukacs

[11] 3,900,963

[45] Aug. 26, 1975

[54] METHOD AND MEANS OF PREGERMINATING GRASS SEEDS

[75] Inventor: George Tukacs, New Milford, Conn.

[73] Assignee: Pre-Germ Seeding Corporation, Bergen, N.Y.

[22] Filed: Apr. 5, 1974

[21] Appl. No.: 458,239

Related U.S. Application Data

[63] Continuation-in-part of Ser. No. 288,418, Sept. 12, 1972, abandoned.

[52] U.S. Cl. .............................. 47/58; 71/24; 47/9
[51] Int. Cl. ............................................ A01b 79/00
[58] Field of Search ........... 47/56, 57.6, 58, DIG. 4; 47/DIG. 9, 34.11, 9; 71/24

[56] References Cited
UNITED STATES PATENTS

| | | | |
|---|---|---|---|
| 1,988,886 | 1/1935 | Wilson | 47/34.11 |
| 2,007,693 | 7/1935 | Ruter et al. | 47/DIG. 9 |
| 2,129,334 | 6/1938 | Northen | 47/DIG. 4 |
| 2,243,857 | 6/1941 | Fischer | 47/56 X |
| 2,570,537 | 10/1951 | Finch | 47/56 X |
| 2,605,589 | 8/1952 | Kuestner | 47/56 |
| 2,785,969 | 3/1957 | Clawson | 47/56 X |
| 2,876,588 | 3/1959 | Tietz et al. | 47/56 X |
| 3,017,720 | 1/1962 | Busch | 47/9 X |
| 3,125,294 | 3/1964 | Lill | 47/9 X |
| 3,134,661 | 5/1964 | Sheppard | 47/DIG. 2 |
| 3,294,045 | 12/1966 | Kelley et al. | 47/56 X |
| 3,351,031 | 11/1967 | Phillips et al. | 47/56 X |
| 3,583,099 | 6/1971 | Fata | 47/56 |
| 3,704,544 | 12/1972 | Spanel | 47/56 |
| 3,722,137 | 3/1973 | Kesinger et al. | 47/56 |
| 3,748,783 | 7/1973 | Sokolies | 47/34.11 X |

FOREIGN PATENTS OR APPLICATIONS

| | | | |
|---|---|---|---|
| 332,278 | 7/1930 | United Kingdom | 47/DIG. 2 |
| 403,411 | 12/1933 | United Kingdom | 47/57.6 |
| 461,018 | 11/1949 | Canada | 47/56 |
| 1,041,133 | 9/1966 | United Kingdom | 47/56 |
| 214,889 | 5/1968 | U.S.S.R. | 47/DIG. 9 |

OTHER PUBLICATIONS

"Mist Propagation of Cuttings" Rowe–Dutton, p. 36 Commonwealth Agricultural Bureau 1959.
"Glass Jar Growing of Roses is Fun" Alfred Putz, The Washington Post, Jun. 25, 1950 10 R.
"Rooting Medium Told" American Nurseryman, p. 122, Vol. 119, No. 1, Jan. 1, 1964.
"Root Hulley Cuttings; How to Snip Roses" Alice Youngman, Sunday Star, Wash. D.C. Aug. 4, 1957 C7.

*Primary Examiner*—E. H. Eickholt
*Attorney, Agent, or Firm*—Shlesinger, Fitzsimmons & Shlesinger

[57] ABSTRACT

This process involves preparation of a special carrier or seed bed with which grass seed and water are mixed in predetermined ratios. The seeded carrier is then sealed in partially filled containers or bags, and maintained at an ambient temperature of approximately 70° F for germination period of from 3 to 15 days, depending upon the type of grass seed employed. Germination takes place rapidly in the sealed bags, and when complete, the small plantlets produced by the germination process are scattered and raked into the top soil of a lawn, or the like, from which grass will then emerge predictably within from 3 to 8 days, depending on the seed used. The process reduces the combined periods of germination and emergence of common rye and bent grass to as little as 6 days.

10 Claims, No Drawings

METHOD AND MEANS OF PREGERMINATING GRASS SEEDS

This is a continuation-in-part of my U.S. patent application Ser. No. 288,418, filed Sept. 12, 1972 and now abandoned.

This invention relates to the planting of grass lawns, and more particularly to a novel method and means for pregerminating the grass seeds used in such lawns.

Open living areas with green lawns are stylish from coast to coast. Moreover, although large sums of money are spent on lawn maintenance, nevertheless the actual planting, repair or renovation of a lawn is done in most cases the same way it was 150 years ago — i.e., simply by sowing the lawn with dry, conventional grass seeds. Each year it is estimated that millions of pounds of grass seeds are lost because of this antiquated practice, either blown away by wind or washed out by rain.

Marketing and planting practices for nursery and home-garden products, on the other hand, have improved tremendously. Fully grown trees and shrubbery may now be transplanted almost any day of the year. Years ago some of the best sellers in grocery stores were the packaged flower and garden seeds, but today flower and garden plants seem to be preferred. The advantage over seeds, of course, is that the plants have passed the most critical periods of their life spans, and are ready to flower or bear fruits within short periods of time. Moreover, in recent decades several improved methods of division, budding, cutting, layering, dividing etc. have been developed by gardeners and devoted nurserymen to perpetuate plant species and variety, to improve the yields of plants, to enlarge and further beautify their flowers, and to create new colors, shapes and life spans. Processes and methods have also been employed to promote natural increase in some plants.

In contrast to this, new methods of grass propagation, and inducements to fast germination and growth of grass seeds, are missing from the horticultural achievements of our times.

In general, lawn grasses are very slow starters; and after seeding a bed it takes from three to six weeks for the grass to emerge. Because of this long "waiting period," or preemergence period, the expensive seed-bed may be eroded away by rain or wind.

Another serious disadvantage of conventional seeding methods is the fact that during the long pre-emergence period fast germinating weeds establish themselves and grow without opposition. Such weeds take away food and moisture from the grass and make uniform coverage impossible.

Another serious disadvantage is the moisture requirement of the seed bed. Because moisture on the seeded area is constantly needed during the pre-emergence period, the water requirement is tremendous. This has given rise to the practice of mulching or covering the seed bed with hay or straw for the pre-emergence period to help induce seed germination. Mulch, however, is expensive; it creates an unpleasant sight around the lawn or home; and it is difficult to remove without destroying or pulling up most of the young grass plantlets.

Another serious disadvantage of a lawn that is seeded in the conventional manner is that it is extremely difficult to determine exactly when a new lawn actually has become an established lawn. The reason for this is that the time of actual germination is uncertain. Moreover, with conventional seeding the "at random" and haphazard broadcasting of seeds results in non-uniform coverage. Grass seeds are vastly different in size. For example, Italian and domestic rye grasses have about 200,000 seeds per pound, fescues about 600,000, Kentucky Blue Grass over two million, and bent-grasses around three million. Moreover, the seed coat is different according to varieties. Therefore, even under laboratory conditions germination time is never the same for different types of seeds. The mixtures made up of low seed count per pound grasses and high seed count varieties cause further problems. During transportation and handling the smaller seeds settle on the bottom of the package, while the larger seeds tend to remain on the top.

Other serious disadvantages are the "new" ways grass seeds are utilized in establishing a new lawn or renovating an old one. Almost every seed company, even local retailers, are intermixing different varieties of grass seeds for the purpose of better growth. These so-called "scientific" mixtures use, principally, quick germinating rye-grass seeds to gain a very quick coverage. Rye grass will emerge in eight to ten days after planting, and allegedly will protect, shade and safeguard the later emerging blue grasses. However, experience indicates that a vigorously growing rye grass, instead of nursing the latter emerging blue grasses, will oppress them by crowding them out and taking away their food and moisture.

While the sodded lawn has been proposed as an alternative to a conventional lawn seeding, and allegedly is the best method for producing an instant lawn, it nevertheless is a costly operation. Depending on the kind of turf used, installing one acre of sodded lawn may well cost over ten thousand dollars. The construction of a sod-lawn requires perfect coordination of harvesting, hauling and laying of sod. The turf has to be dry and fresh; and it must be layed in less than two days after arrival. After two days the damp sod will heat up or mold; and in the intense summer heat sod laying is almost impossible. Moreover, until the bottom side of the turf (the root side) is "sticking" to the seed bed uniformly, and the turf edges have grown together, the lawn cannot be used and cannot be mowed. It takes usually two weeks or more until the sodded area becomes a lawn; and the new lawn will be only as good as the area from where the sod came.

Plastic, or man-made lawns, or turf, are equally as expensive.

Accordingly, a principal object of the present invention is to provide a novel and inexpensive method for producing or repairing grass lawns, and which will obviate the numerous disadvantages inherent in conventional lawn seeding methods presently being practiced.

Still another object of this invention is to reduce substantially the waiting period which heretofore separated the planting of grass seed from the emergence of grass in a lawn, thereby preventing weed infestation of newly planted lawns.

Another object of this invention is to provide a novel method of propogating lawn grasses which will reduce substantially the enormous amount of water heretofore required on a newly seeded area in order to achieve germination.

A further object of the present invention is to provide a novel method of planting lawns with pregerminated grass seeds, thereby obviating the need for mulching the lawn, and eliminating also the need for employing blends of fast emerging rye grass and blue grass seeds of the type heretofore employed for quick ground coverage.

A more specific object of this invention is to provide a novel method of pregerminating grass seed, which will rapidly produce hardy, transplantable grass plantlets that may be scattered on a seed bed in much the same manner as the raw seed.

Another object is to provide a novel seed bed composition or soil mixture in which grass seed may be rapidly pregerminated for subsequent transplanting.

Other objects of the invention will be apparent hereinafter from the specification and from the recital of the appended claims.

For a better understanding of the invention it should be noted that during a typical seed germination process, the seed absorbs water, thus enabling its enzymes to convert stored seed starches into sugars. These contribute to the growth of cells and tissues of the embryo, and also increase its size. As a result the embryo is activated, bursts through the water-softened seed coating or cover, and a seedling plant is thus started on its way. Conventional seeding methods, however, often inhibit or preclude the occurence of this germinating process. For example, if the seeds are sown too deeply in moist, cool soil, they often decay without germinating; while seeds sown too shallow in the soil often dry up and are lost before germination can occur. These are among the main reasons why choice seeds often do not germinate on time, and why a large percentage of conventionally sown seeds, as a rule, never do germinate.

The first step in this invention is to mix together an assortment of materials to form a carrier or bed for seed that is to be pregerminated. Preferably such carrier should be capable of holding moisture for a long period of time; it should be firm enough to stand up during transit and handling; it should tolerate extreme temperature variations; it should endure light as well as darkness; and its texture should be such that it may be broadcast freely by hand or machinery. Finally, the intermixed materials should have ingredients that are harmless to humans and beneficial to the seed bed; and are fluffy so that the germination process can continue without interruption even during handling or transit of the seeded carrier.

The first and perhaps most important ingredient for the carrier is humus. Humus soils vary not only with respect to their basic mineral composition, but also with respect to the size of their particles. For best results a fine grained peat or muck humus is preferred. In its moist condition such humus will stick to the seed and remain affixed to the roots of the grass plantlets after germination. This phenomenon enables an excellent transplant of each pregerminated seed. Sandy soil, or soil with larger grain composition should be avoided.

The second important ingredient of the carrier is volcanic ash. The preferred kind is perlite. It is almost pure white in color and has a uniform grain structure ideal to make the fine grained humus fluffy. It is very light in weight, and is not moisture abosrbent. It has several functions in the carrier; it is white and therefore makes an excellent trace material during the seeding operation; because it is firm and non-absorbent it protects the mixture in transit, acting as a shock abosrbent and preventing pressure damage or hardening; it is an excellent agent for preventing the moist material from settling and becoming compacted; at mixes excellently with all other carrier ingredients; and being non-organic it causes no chemical reaction of any kind.

The best substitute for perlite is vermiculite. However, vermiculite will absorb water and will add to the weight of the carrier mixture; and it has no distinct color so that it does not act as a trace agent. Exposed to moisture vermiculite will become sticky, and therefore its commercial use as a part of a carrier of the type disclosed herein is limited. It may be utilized in special cases, for example, in on-the-sight pregermination, where handling, transit and hauling problems are not present.

Another substitute for perlite is sand having a large grain composition (washed sand or mason sand). Sand, however, is a very heavy substance; and its grain composition is not uniform, nor large enough to sustain the most desirable air circulation within the mixture. Furthermore, because of the variations in its grain sizes, it does not mix uniformly. Even with the greatest care, the small grains tend to settle to the bottom of the carrier, while the larger grains remain on top. Also, the smaller grains of the sand will intermix thoroughly with the humus, so much so that moist humus mixed therewith may lose most of its desirable stickiness, or tacky characteristic.

The third ingredient used to make up the novel seed carrier is peat moss. Its main value, as used in the invention, is its ability to abosrb and hold moisture, and not its ability to function as a source of humus or organic matter. In general, three kinds of peat moss are recognized. Upland peat, which is less completely rotted and contains fragments of twigs, leaves, roots, etc.; grass peat, which is derived of swamp grasses, sedges etc.; and moss peat (hereinafter peat moss), which is composed mainly of decayed or decomposed sphagnum deposits. For the carrier of this invention peat moss is preferred. This material should be thoroughly crushed and sifted to fit the mixing machine, which may be used to blend the carrier ingredients. Peat moss prepared in such a way will mix perfectly and uniformly with the other carrier ingredients.

Peat moss has a hydrogen ion concentration of much less than 7 pH. While this acidity is not beneficial for grass development in the growing stages, it plays a very important role in germination. While the presence of carbonic, humic, tanic, and other acids in peat moss is not yet well understood, they are definitely beneficial for grass seed germination. Grass seed has an impervious, protecting cover with several coatings. These coatings are impenetrable for moisture. A certain conditioning is needed in order to start the absorption of moisture by the seed, and its consequent germination. Nature performs the conditioning in its own way, but very slowly. Long experimentation shows, however, that acids like humic, carbonic and and tanic play an important role in breaking down the protecting coating around the seed; and such phenomenon makes the acids contained in the peat moss as used in the invention, an important factor in the carrier complex.

Peat moss has still another significant role in the carrier. Besides its moisture holding ability it balances the moisture in the mixture. If the carrier were to contain no peat moss additives the water slowly would settle to the bottom of the bulk carrier. Materials made up principally of grain components tend gradually to settle and dry out. However peat moss has only a very low percentage of grain particles, and is composed mainly of fiber-like or thread-like components. This fibrous material holds the water for a long time evenly and steadily without settling. It has been found that the mixed carrier mass has remained almost the same as far as moisture content and distribution are concerned, even when subjected to the vibrations and pressure of handling.

The carrier, or un-activated seed bed (seed bed without moisture and seed), is prepared by blending its three ingredients in the ratios of two parts by volume of vulcanic ash, to one part by volume of humus, to one part by volume of peat moss. By way of example, first the two parts of ash, e.g., perlite, are placed into a conventional mixer. While the mixer is operating or rotating, the one part of humus is added; and a few minutes later the one part of peat moss. The perlite mat be used from the bag as it is marketed. Humus and peat moss, however, should be broken up and screened before being placed in the mixer. This mixture may be stored for a long time. It is advisable, however, to cover such storage piles in order to protect the so-called unactivated carrier or seed bed from heavy rainfall, weed seed infestation, etc.

In order to utilize properly a carrier or seed bed mixture of the type above-described, seed and water must be added in proper quantities. For example, for most rye grasses, fescues and bent grasses it has been found that excellent results can be achieved by using approximately one part by volume of seed for each nine parts, by volume, of the carrier; and approximately one part by volume of water for each ten parts of the seed and carrier blend. In the example under consideration, while the mixing machine is rotating with the now-blended nine parts of seed bed material, the one part of grass seed is added slowly and gradually, e.g. with a bucket. It is advisable periodically to take out samples and to look for an even distribution of seed in the mixture. Thereafter the approximately one part of water is added gradually and uniformly to the 9 to 1 carrier to seed mixture. The weight or volume of the water additive cannot be specified exactly, because humus and peat moss are marketed with various moisture contents. Some are dry, some are not dry. In order to achieve a well balanced seed bed material one must develop a "feel" through experience. During mixing, therefore, one should take out samples from the mixer for tests; and when the mixture is moderately wet or damp but under pressure will not stick together in the hand, the seed bed is ready for packaging. The end product should be just moist.

It has been discovered that this process will also work well when the above-noted volumetric ratios of carrier to seed to water are approximately eight to one to one, respectively, rather than nine to one to one. In cases where the 8-1-1 ratios are employed, of course, the seed density is slightly higher for a given batch.

In mixtures where very hard coated seeds (e.g. Kentucky Blue Grass, Merion, etc.) are mixed in for pregermination, it is advisable to mix with each gallon of water used eight drops of salicylic acid ($C_7H_6O_3$), which according to experiments helps to wear off the hard coating on the seeds. This acid is used in a diluted form in which the concentrated acid has been thinned with water in the ratio of, for example, 10 water to 1 acid. The acid also functions as a preservative, enabling germinated mixtures to be stored for longer periods of time without deteriorating — e.g. for several days after germination has occurred.

For pregerminating Zoysia or Bermuda grasses, "hulled" seeds are employed. In their natural form, these seeds are enclosed in hard, moisture-resistant shells, which heretofore have made it very difficult and time consuming to establish lawns of these grasses by conventional sowing methods. In recent years a method has been found to hull or remove the hard outer shell from these seeds before planting, thus reducing somewhat the time for grass emergence after conventional sowing. Even when these hulled seeds are employed, however, conventionally sown lawns still take unreasonably long time periods before the Zoysia or Bermuda grasses begin to appear.

It has been found, that by mixing approximately 13 parts, by volume, of a muck-humus top soil with one part, by volume, of the hulled Zoysia or Bermuda grass seeds, and with one part, by volume, of water, excellent pregermination can be achieved within 5½ days. Preferably the muck-humus is the type dug from lake beds or old marshlands. It should be screened to a fairly fine grain; and no fertilizers or lime need be added. In practice the 13 parts muck-humus may be dumped into a rotating mixer, after which the one part "hulled" grass seed is added. After they are thoroughly mixed, the mixture is sprayed with one part water, which preferably is luke-warm and clean. The quantity of water may be reduced if the muck-humus has a high water content at the outset. In any event, the resulting mixture should be just moist. Although volcanic ash and peat moss do not have to be mixed with the muck-humus for pregermination of the Bermuda and Zoysia grasses, salicytic acid may be added to the seeded mixture, as noted above, to help expedite germination and to prolong the possible storage time following germination.

After a seeded mixture has been moistened as described above, it is packaged in air-tight, water-proof containers or bags. Packaging of the already mixed and activated material is not merely for practical handling and hauling purposes; but it serves also to make the pregermination stage possible. The material never should be packed tightly into the bags — e.g., the bags are not filled completely; and in each bag the material preferably should never weigh more than 50 or 60 lbs. It is essential that the bags be sealed air tight in order to preserve the moisture in the mixture, and to help insure a steady temperature. For best results the bags are stored in a temperature ambient above 65°F, and preferably above 70°F. for Bermuda and Zoysia grasses, until germination has occurred. The tightly sealed bags will also keep out rot causing agents, and unwanted added moisture.

Preferably activated seed bed material is packed in dark plastic bags, which may then be stored either inside or outside, in shade or in a sunny location. Germination in the bags will occur during handling or while in transit, just as well as when the bags are in storage. All bags used should be perfectly clean and free from molds or bacteria, and should not be re-used.

For very large orders an entirely different method may be used. It is possible to pregerminate grass seed in bulk right at the site without bagging the material. It is possible even to coordinate the time of germination with the progress of the work, so that the grass for each installation will germinate one or two days after the other. In such cases the contractor may be supplied all the time with freshly germinated material. Bulk germination under field conditions or inside a storage building uses the same procedure. For example, a huge plastic sheet is placed on the ground. The necessary quantities of carrier, seed and water are then mixed in the above-noted ratios (8-1-1, 9-1-1 or 13-1-1), and placed on the sheet except for a marginal area of about two feet around its edges. The pile should not be more than one foot thick so as to insure good air circulation. Then another plastic sheet is placed on the top of the pile so that the bottom and top sheets match. In order to seal the mixture the overlapping edges of the sheets may then be covered with wet sand to cut off all air circulation from the outside.

After a waiting period the activated mixture, whether packaged in a container or prepared in bulk form, becomes germinated. It is very important to note, however, that satisfactory germination, or "readiness" for planting shows up in different ways with different grass varieties. All bent grasses, rye, and fescue will crack open and will reveal thousands of small grass plantlets after a three to four day waiting period. The Bermuda and Zoysia grass seeds also develop plantlets at the end of their 5½ day germination periods, but the blue grasses (Kentucky Blue and Meriod), however, will not show plantlet formations. Their "readiness" is recognized only by the number of days they were exposed to the germination process. Windsor, Plato, Baron and other Kentucky grass varieties will appear much the same as does their parent plant, but thier plantlet formation is spotty and not conclusive.

Experienced eyes can tell at once whether or not germination is complete, but in general, the germination day-count is the best indicator. The "non-showing" characteristics of blue grasses give it a tremendous advantage as far as pregermination is concerned. With these grasses it is possible to hold the "ready" material (moistened carrier and seed mixture) much longer than material containing the "showing" (bent, rye and fescue) varieties. The latter varieties will overgrow within 3–4 days of storage and become hard to manage. Therefore, it is essential to know the exact duration of the "waiting" or germination period for each grass variety prepared in accordance with this invention.

Also, important is the length of time it takes for the germinated plantlets to emerge after broadcasting them on a lawn or similar seed bed. These approximate waiting periods are listed as follows:

| Waiting Periods For Germination: | |
| --- | --- |
| Rye grass of all variety | 3 days |
| Fescues | 4 days |
| Bent grasses | 3¼ days |
| Rhode Island Red Top | 3¼ days |
| Poa Trivialis | 4 days |
| Kentucky Blue | 14 days |
| Merion | 15 days |
| Windsor | 5 days |
| Plato | 5½ days |
| Baron | 6 days |
| Bermuda and Zoysia (hulled seeds) | 5½ days |
| Waiting Periods For Emergence After Broadcast | |
| Rye grass of all variety | 3 days |
| Fescues | 4 days |
| Bent grasses | 3 days |
| Rhode Island Red Top | 4 days |
| Poa Trivialis | 4 days |
| Kentucky Blue | 7 days |
| Merion | 8 days |
| Windsor | 5 days |
| Plato | 5 days |
| Baron | 5¼ days |
| Bermuda and Zoysia | 3½ days |

There are various blends of these grasses in existence, but experience shows that they will respond to the process, and will have germination and emergence waiting periods similar to those of the respective parent plant or grass.

Broadcasting or sowing pregerminated grass plantlets is a simple procedure performed in a manner similar to conventional seeding. After broadcast the plantlets may be raked into the bed, which may then be rolled. During broadcasting some plantlets fall on the ground upside down, some stand up, some drop into the soil crevices, and some remain on the top. In a matter of hours, however, the will make intimate contact with the soil of the bed, and within a few days they will emerge uniformly. It is important to water thoroughly the seeded area, and to keep it in a moist condition until grass has emerged. When seeding or broadcasting on hot days, particularly, the unused material should be protected by storing the open bags in shady places. The seeded bed preferably is raked in sections instead of waiting until the whole area is seeded.

From the foregoing it will be apparent that the instant invention considerably simplifies the planting of lawns, and the like, as compared to prior practices. By using pregerminated seeds, complete coverage is achieved, even with the slow germinated blue grasses, in less time than any known grass seeding practice in existence. In fact, after being broadcast on a bed, pre-germinated grass seed emerges with as little as a few days, and needs no mulching so the seeded area has a neat appearance. Furthermore, it reduces the cost at least 25 percent, as compared to prior seeding practices, and reduces even further the water requirements. It is estimated, for example, that by using as little as ten gallons of water enough grass seed could be germinated by this novel process to cover as much as one acre of land.

With the controlled, predictable germination afforded by this invention, a contractor may tell in advance when the grass will emerge and what day it will afford complete coverage. With conventional seedings the outcome is not predictable, and depends entirely on circumstances (weather, temperature, moisture, etc.). Moreover, whereas for conventional sowing the seeding requirements according to dealer recommendations may vary from, for example, from 100 lbs. to 400 lbs of seed per acre, with pregerminated grass such overseeding or excessive seed-concentrations are thoroughly eliminated. Because the grass seed is intermixed with a "carrier" material in which the seed is evenly distributed, a systematic, balanced and exact coverage is achieved. Moreover, in the case of the novel carrier material which contains nearly white vulcanic ash (perlite), this ash serves not only as an ingredient of the seed bed, but also as a trace material, a sure guide for the seeder. This nearly white material will show the extent of the seeding operation, and makes the seeded and unseeded sections readily distinguishable.

The invention also makes it possible in certain areas of the country to prolong the seeding season which heretofore was limited not only by the long germination period, but also by adverse moisture and temperature conditions. Grass, for example, is effected by three distinctly different temperature ranges. They are as follows: Grass germination occurs at approximately 65°F or over; growth previously germinated grass is induced at temperatures of 45°F or over; and dormancy occurs at temperatures below 45°F or over 85°F. Raw or ungerminated grass seed sown into a soil having a temperature less than 65°F will not germinate until warmer conditions set in. On the other hand, pregerminated grass will resume its growth at once even when sown in soil having a temperature as low as 45°F or above, because the germination has already taken place.

Since the seeded carrier is sealed or packaged in partially-filled plastic bags, or the like, the moisture content will not increase or decrease in transit or in handling. The seed intermixed with moist carrier material will respond to the moisture during germination to create gases inside the package. The degree of tolerance of such gases must be taken into account. To control such gases not only the amount of seed but the ratio of the seed to the carrier should be established in the abovenoted ratios. Also, the bags or containers should not be overloaded — e.g. not over three quarters full.

While volcanic ash has been employed as a non-absorbent, non-organic fluffer or shock absorbent to prevent excessive compacting of the seeded carrier material, it will be readily apparent that a similar granular material, synthetic or otherwise, could be employed for this purpose. Moreover, while the invention has been described in connection with grass seed, it will be apparent that it may be used to germinate other types of seeds, if desired, and this application is intended to cover any such variations which are apparent from this specification, or which fall within the scope of the appended claims.

Having thus described my invention, what I claim is:

1. The method of producing bulk quantities of randomly oriented pregerminated grass seed plantlets which are readily separable from each other for broadcast by scattering onto a lawn bed or the like, comprising mixing together a quantity of grass seed, water, and humus in predetermined ratios to form a moist, bulk mixture in which the grass seeds are disposed randomly and uniformly throughout the mixture, sealing the moist, bulk mixture in a waterproof, airtight container of any desired configuration, and in such manner that the mixture fills part only of said container, and maintaining the container sealed and in a temperature ambient above 65°F for a period of from approximately three to fifteen days, depending on the type of grass seed employed, thereby to effect germination of the grass seeds into randomly oriented, readily separable plantlets disposed throughout the mixture in the sealed container.

2. The method as defined in claim 1, including mixing a non-absorbent, non-organic granular material and fiberous, water absorbent organic material with said humus in volumetric ratios of approximately two to one to one, respectively, to form a carrier, and mixing said quantity of grass seed and said water with said carrier in volumetric ratios of approximately one to one to eight to form said moist mixture.

3. The method as defined in claim 2, wherein said non-organic material comprises volcanic ash, and said organic material comprises peat moss.

4. The method as defined in claim 1, including mixing a small quantity of dilute salicylic acid with said moist mixture.

5. The method as defined in claim 1, including mixing said quantity of grass seed, said water and said humus in volumetric ratios of approximately one to one to thirteen, respectively.

6. The method as defined in claim 5, wherein said grass seed comprises hulled grass seeds selected from the class consisting of Zoysia and Bermuda grass seeds.

7. The method of producing in bulk form in readily transportable containers such as bags, boxes and the like, germinated grass seeds which are readily broadcastable by scattering when removed from said containers comprising providing a generally fluffy, moisture-retentive seed carrier containing humus, mixing together in bulk form a quantity of said carrier and a quantity of grass seed in the volumetric ratios of, approximately, from 8 to 13 parts carrier, to one part seed, and so as to dispose the grass seed randomly and substantially uniformly throughout the carrier, adding water to the carrier and seed mixture until the mixture is moist, sealing this moist mixture in bulk form in a waterproof, air-tight, transportable container of any desired configuration, and so that said mixture fills part only of said container, maintaining the sealed container at a temperature ambient of above approximately 65°F for a period of from approximately three to fifteen days, depending upon the species of grass seed in the container, thereby to effect germination of the seeds throughout the mixture in the sealed container, and removing the germinated seeds from the container before broadcast thereof.

8. The method as defined in claim 7, including mixing together in bulk a non-organic, non-moisture-absorbent granular material, an organic, moisture-absorbent fiberous material, and humus, in the volumetric ratios of approximately two to one to one, respectively, to form said carrier, and mixing said carrier, said grass seed and said water in the volumetric ratios of approximately eight to one to one, respectively to form said moist mixture.

9. The method as defined in claim 8, wherein said grass seed is of the blue grass variety, said container is maintained sealed in said temperature ambient of 65°F for approximately fourteen days, and dilute salicylic acid is added to said water.

10. The method as claimed in claim 7, wherein said carrier consists substantially of muck-humus and is mixed with said grass seed and said water in the volumetric ratios of approximately thirteen to one to one, respectively, to form said moist mixture.

* * * * *